US007954297B1

(12) United States Patent
Stearns

(10) Patent No.: US 7,954,297 B1
(45) Date of Patent: Jun. 7, 2011

(54) FOUR RING SPHERICAL CONNECTING HUB FOR BUILDING SPACE FRAME STRUCTURES

(76) Inventor: Daniel Nichols Stearns, Johnson, VT (US)

( * ) Notice: Subject to any disclaimer, the term of this patent is extended or adjusted under 35 U.S.C. 154(b) by 392 days.

(21) Appl. No.: 12/289,224

(22) Filed: Oct. 23, 2008

Related U.S. Application Data

(60) Provisional application No. 61/000,054, filed on Oct. 24, 2007.

(51) Int. Cl.
 *E04H 12/00* (2006.01)
(52) U.S. Cl. .......................................... 52/655.2; 52/578
(58) Field of Classification Search ............... 52/655.2, 52/656.9, 578; 403/170
 See application file for complete search history.

(56) References Cited

U.S. PATENT DOCUMENTS

| | | | | |
|---|---|---|---|---|
| 2,868,568 A | * | 1/1959 | Frye | 403/171 |
| 4,065,890 A | * | 1/1978 | Fenner | 52/27 |
| 4,905,443 A | * | 3/1990 | Sutcliffe et al. | 52/655.2 |
| 4,932,808 A | * | 6/1990 | Bar et al. | 403/170 |
| 5,318,470 A | * | 6/1994 | Denny | 446/126 |
| RE35,085 E | * | 11/1995 | Sanderson | 52/655.1 |
| 6,491,563 B1 | * | 12/2002 | Bailey | 446/122 |

* cited by examiner

*Primary Examiner* — Basil Katcheves

(57) ABSTRACT

A spherical hub consisting of four interlocking and concentric rings 1, 2, 3, 4, 5, 6, 8, 9 and 10 and as many collar assembly pieces 12, 13, 14 as desired that can be used to receive tubular rod struts from a multiplicity of angles. The four rings are each uniquely grooved so that they fit and lock together in a specific order to hold a spherical form. The hubs can be used to assemble space frame and other structures in a wide variety of shapes and sizes 15.

1 Claim, 8 Drawing Sheets

FOUR RING SPHERICAL CONNECTING HUB FOR BUILDING SPACE FRAME STRUCTURES

CROSS-REFERENCE TO RELATED APPLICATIONS

This application claims the benefit of provisional patent application Ser. No. 61/000,054 filed 2007 Oct. 24 by the present inventor.

FEDERALLY SPONSORED RESEARCH

Not Applicable

SEQUENCE LISTING OR PROGRAM

Not Applicable

BACKGROUND

1. Field of Invention

This invention relates to the coupling of light-weight tubular structural members to an inexpensive and easy to fabricate quick connect spherical hub or node mechanism for the assembly of truss structures to be used as a component based, building kit for larger space frame structures.

2. Prior Art

Traditionally, space frame truss structures have been constructed from component kits comprised of nodal elements and struts, which fit together in a geometrically repeating pattern with the strut ends securely attached to the nodal elements to build large, multi-component structures. Alternatively, nodeless methods have been developed that utilize welding, riveting and flanging struts together. Using these methods, long distances can be spanned with relatively light weight materials, achieving a level of strength otherwise only possible by using heavier conventional beam construction methods. The resulting space frame structures are light weight, high strength, and relatively easy to build.

Space frame construction has been widely used for building commercial structures but not for residential structures. It is currently limited in application due to high component manufacturing costs and weight concerns. Typically, space frame nodal elements are made with forged and machined steel spherical hubs. A common strut member is screwed or locked into the facet receiving opening on the hub. These forged and machined hubs are not only heavy and expensive to make, but they typically are limited to at most twelve radial directions for connecting struts. Additionally, later modifications to the assembled space frame structure (either expansion or reduction) are either impossible or require significant structural disassembly prior to making changes.

If component based, space frame construction methods are to achieve their earlier anticipated wide scale use, the hubs and strut fastening mechanisms must become simpler, lighter, and less expensive to manufacture. Additionally, the ability to easily modify these structures will enhance their potential use.

SUMMARY

In accordance with one embodiment, a spherical hub consists of four interlocking and concentric rings and as many collar assembly pieces as desired that can be used to receive tubular rod struts from as many as 18 different angles and component parts from as many as 26 different angles.

DRAWINGS

Figures

REFERENCE NUMERALS

| | | | |
|---|---|---|---|
| 1 | Component part of first ring | 2 | Component part of first ring |
| 3 | Component part of second ring | 4 | Component part of second ring |
| 5 | Component part of third ring | 6 | Component part of third ring |
| 7 | Component part of third ring | 8 | Component part of third ring |
| 9 | Component part of fourth ring | 10 | Component part of fourth ring |
| 11 | Ring key | 12 | Component part of collar assembly |
| 13 | Component part of collar assembly | 14 | Component part of collar assembly |
| 15 | Octet truss structure | | |

DETAILED DESCRIPTION

Figure 1:
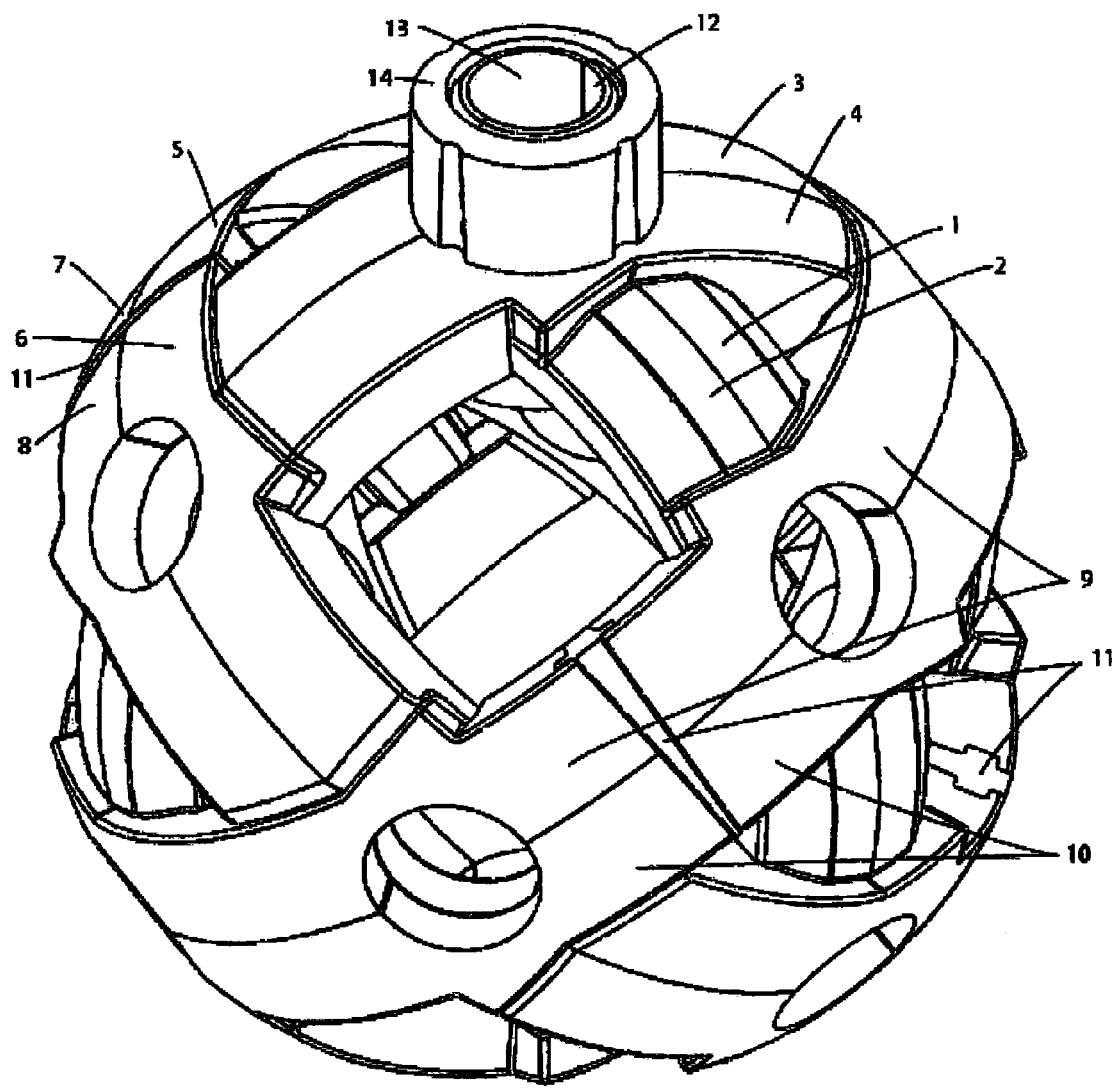
FIG. 1 shows a fully assembled four ring spherical hub.
Figure 2:
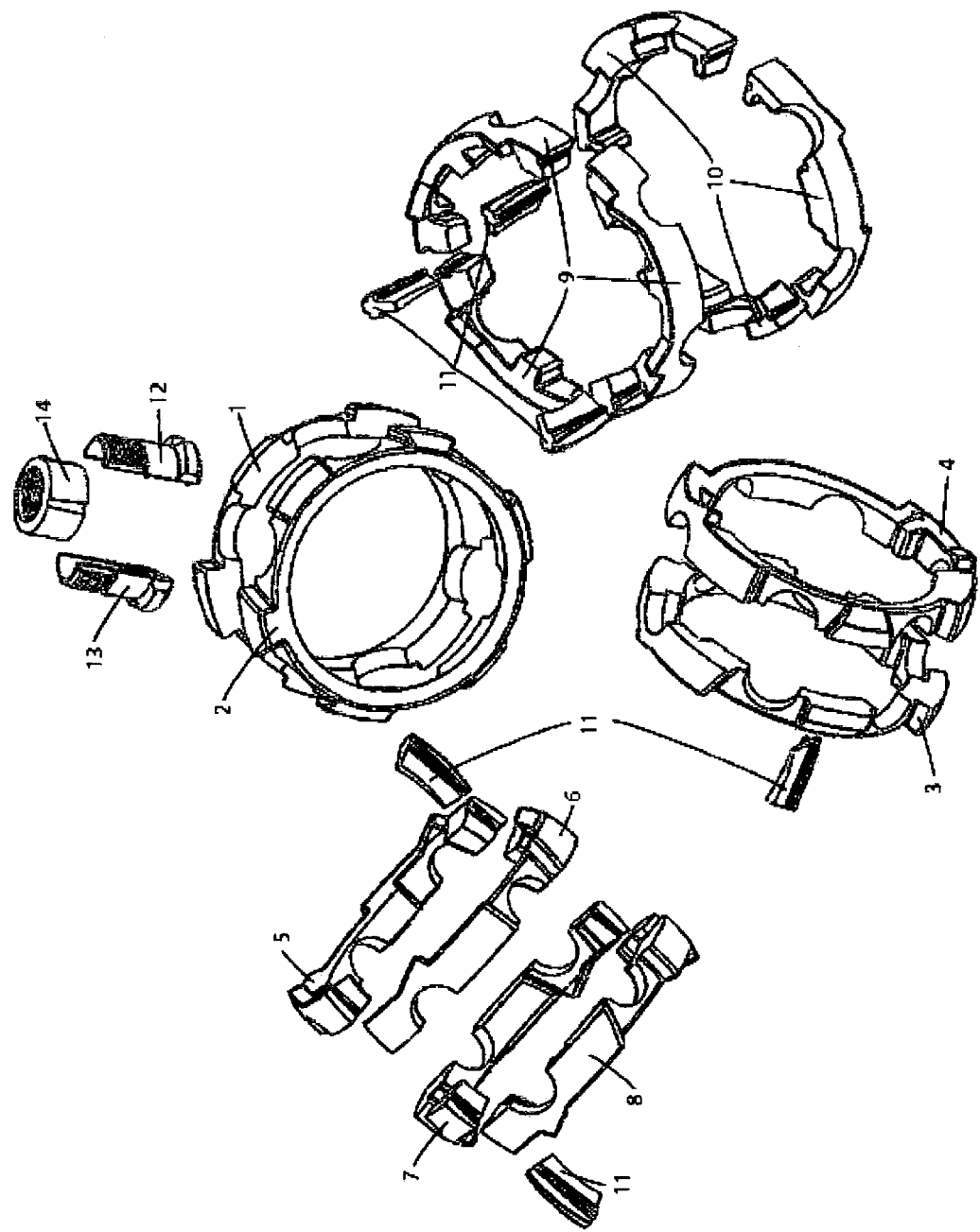
FIG. 2 shows an exploded view of said hub, including the component parts of each of the four rings, ring keys used to lock the ring components together and a disassembled collar assembly used to connect tubular struts to the fully assembled hub.

FIGS. 1 and 2—Preferred Embodiment

One embodiment of spherical hub is illustrated in FIG. 1 (fully assembled) and FIG. 2 (exploded). The hub consists of four interlocking concentric rings. In order to facilitate assembly while using injection molded parts, each ring is made from two to six parts and additional ring keys as needed to completely lock the ring pieces together. The first ring has two parts 1 and 2; the second ring has two parts 3, 4 and a single ring key 11; the third ring has four parts 5, 6, 7, 8, and two ring keys 11; the fourth ring has six parts, three of both parts 9 and 10, and three ring keys 11. The ring keys 11, lock the spherical assembly together and are added last, after first assembling the other ring components together. The collar device 12, 13 and 14, is used to connect tubular struts to the fully assembled hub.

While many materials can be used to manufacture the component parts, the preferred materials may be fiber-reinforced, injection moldable, composite polymeric materials thereby cutting manufacturing costs and component weights while maintaining part strength and rigidity. Some material flex is required to allow the parts to slide over one another in locking together to form the completed spherical form. Standard diameter, conventionally threaded pipes can be used for the connecting strut members. Strut members or component parts can be added to or removed from any hub of an assembled structure without additional structural disassembly.

Assembling the Hub FIGS. 3, 4, 5 and 6

The four rings are each uniquely grooved so that they fit and lock together in a specific order to hold a spherical form. Six holes, equally spaced around the circumference of each of the four rings, align when the four rings are properly assembled.

Figure 3:
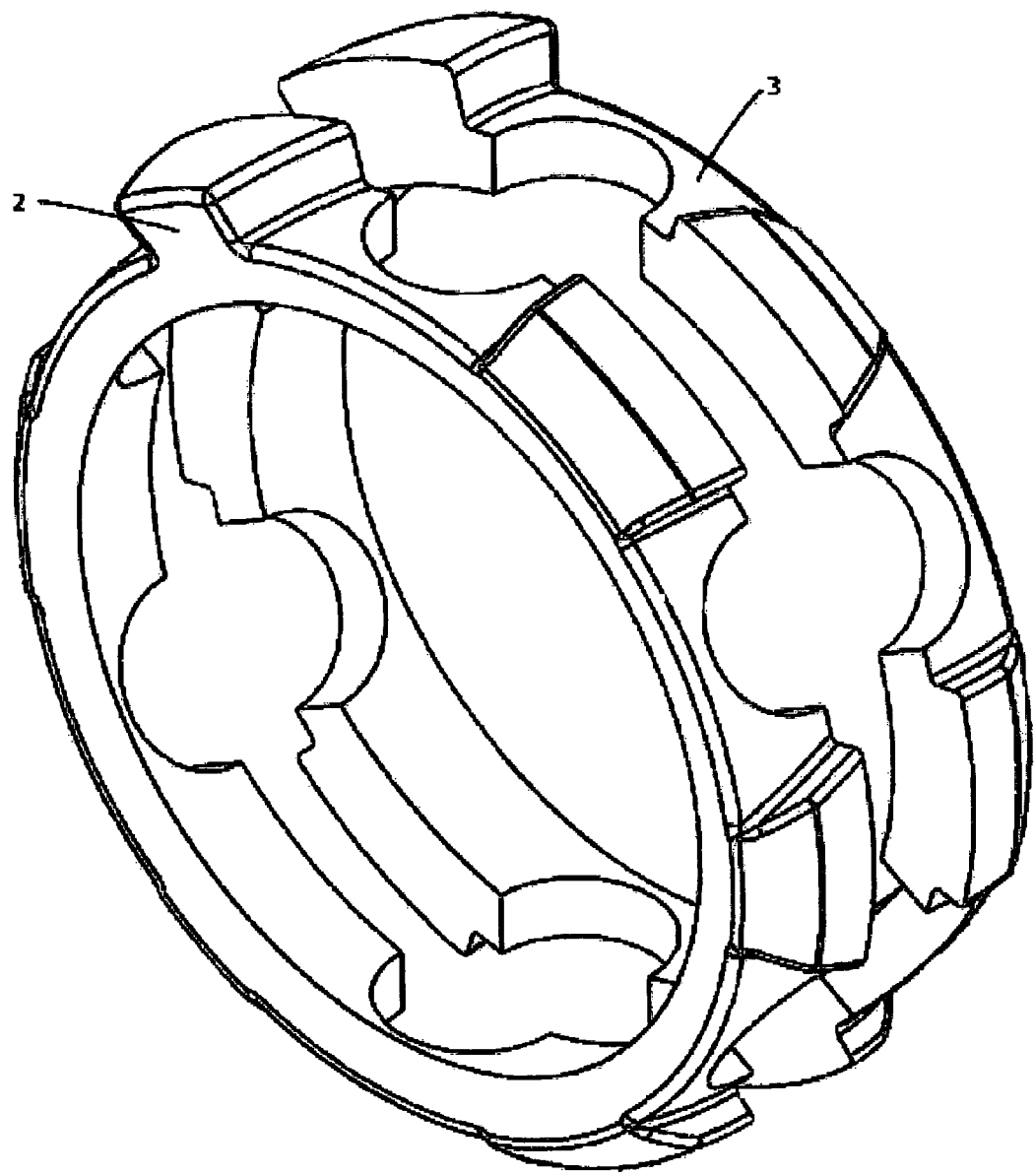
FIG. 3 shows the component parts of the innermost ring (first ring).
Figure 4:
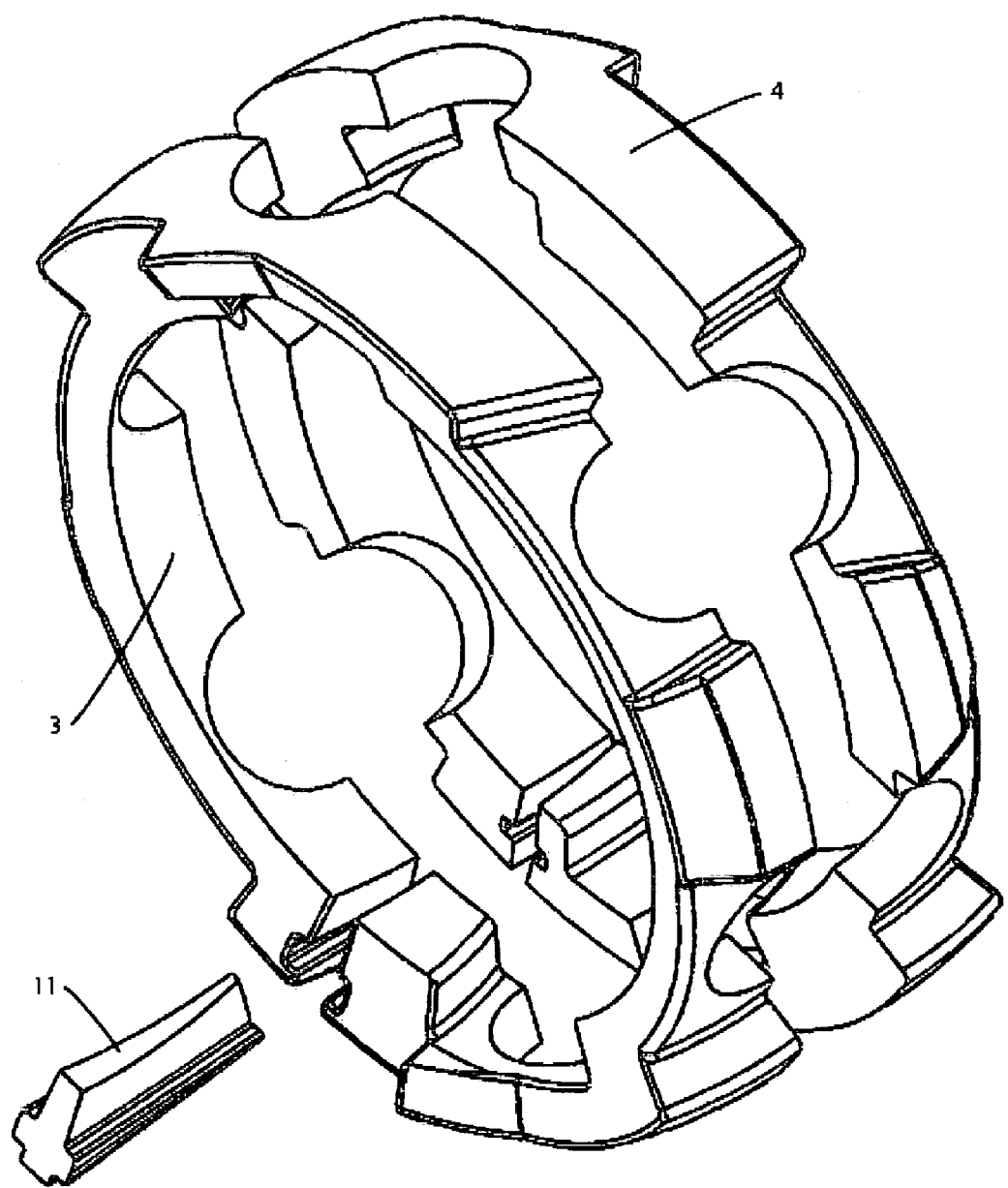
FIG. 4 shows the component parts of the second innermost ring (second ring) including a ring key that is used to lock the separate components of the second ring together.
Figure 5:
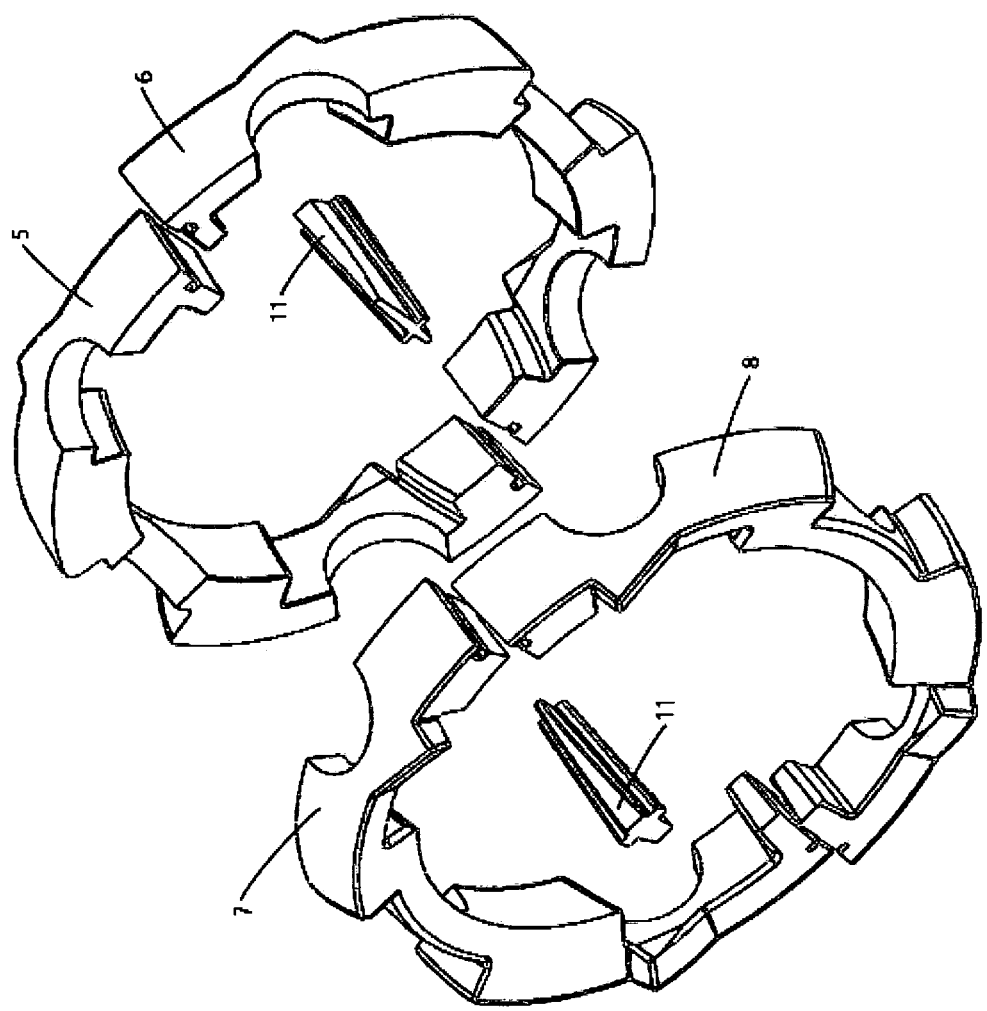
FIG. 5 shows the component parts of the third innermost ring (third ring) including ring keys that are used to lock the separate components of the third ring together.
Figure 6:
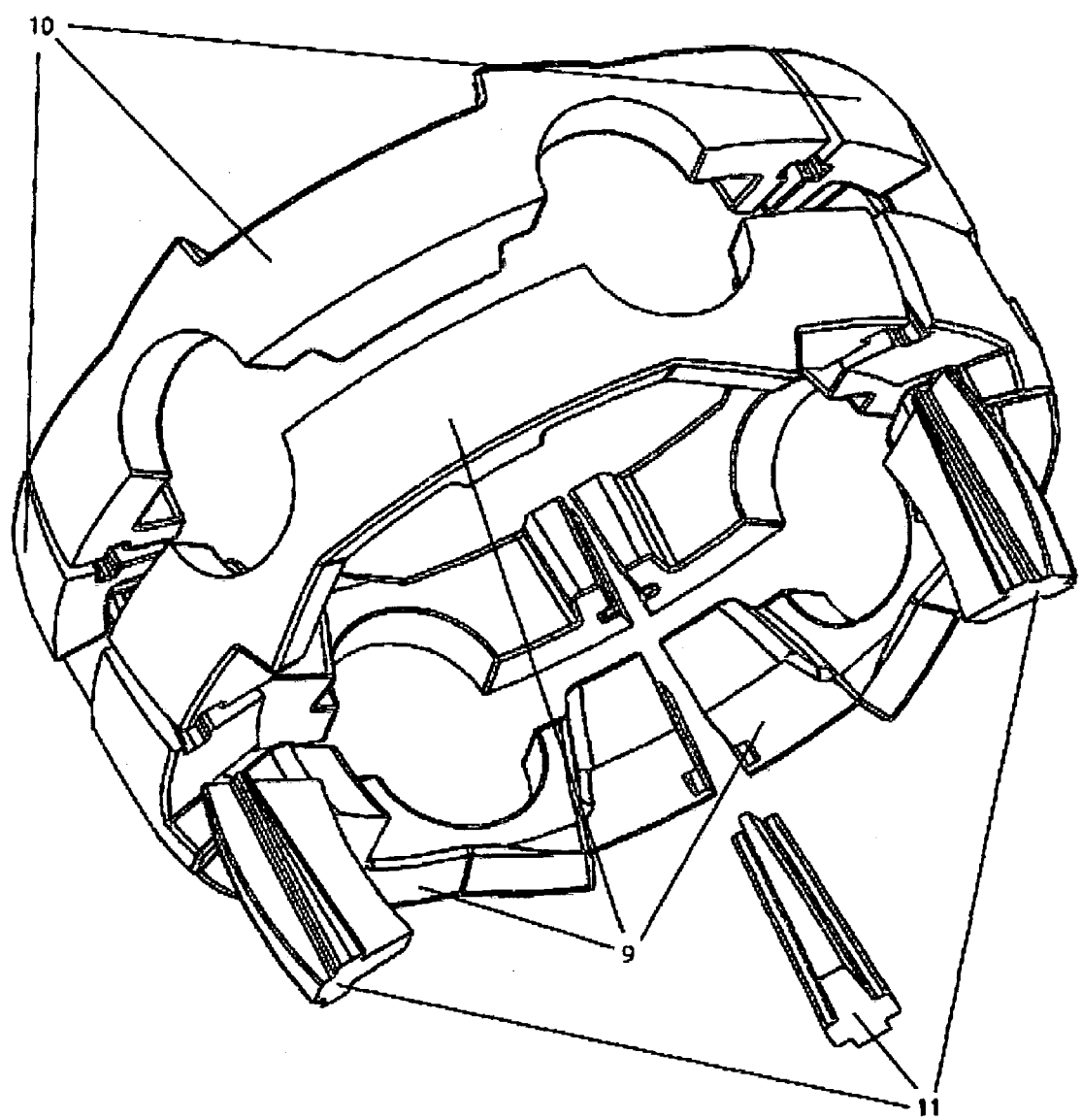
FIG. 6 shows the component parts of the outermost ring (fourth ring) including ring keys that are used to lock the separate components of the fourth ring together.

The first step in assembling the hub is to put the two halves of the first ring together (FIG. 3). This ring, onto which the other three rings are slid over in forming the spherical shape, has six grooves located on its outside. The ring is manufactured in two halves 1 and 2 and because of its location in the hub, it does not require any ring keys to stay together.

The two halves of the second ring, parts 3 and 4 (FIG. 4), slide over and lock onto the first ring one half at a time. A single ring key 11 is inserted between the two parts to lock them into place. The second ring has two grooves located on its inside, and four grooves located on its outside. The two inner grooves on the second ring align with two of the outer grooves on the first ring. The four outer grooves on the second ring allow for the third and fourth ring to slide and fit over it.

The third ring (FIG. 5) has four grooves located on its inside which align with four of the outer grooves on the first two rings, and two grooves located on its outside to allow the fourth ring to slide and fit over it. The third ring is manufactured in four parts 5, 6, 7 and 8. The parts for the third ring fit onto the assembled first two rings one at a time. Two ring keys 11 are used to lock the parts together.

The fourth ring (FIG. 6) has all six of its grooves located on its inside to fit onto the previously assembled first three rings. The fourth ring is manufactured in six parts, three of each component parts 9 and 10. Three ring keys 11 are used to lock the fourth ring together.

Figure 7:
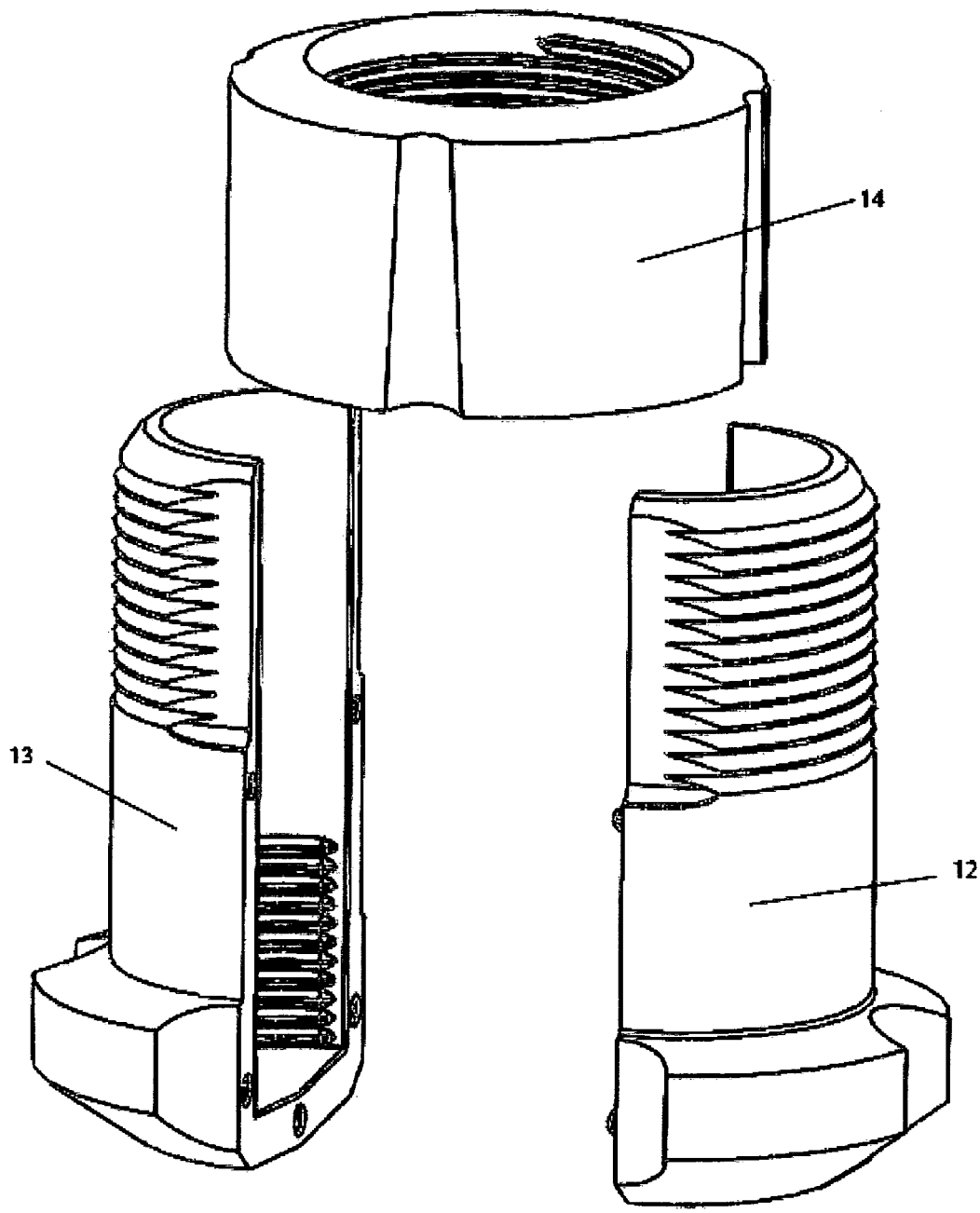
FIG. 7 shows a close up of the disassembled collar assembly
Figure 8:
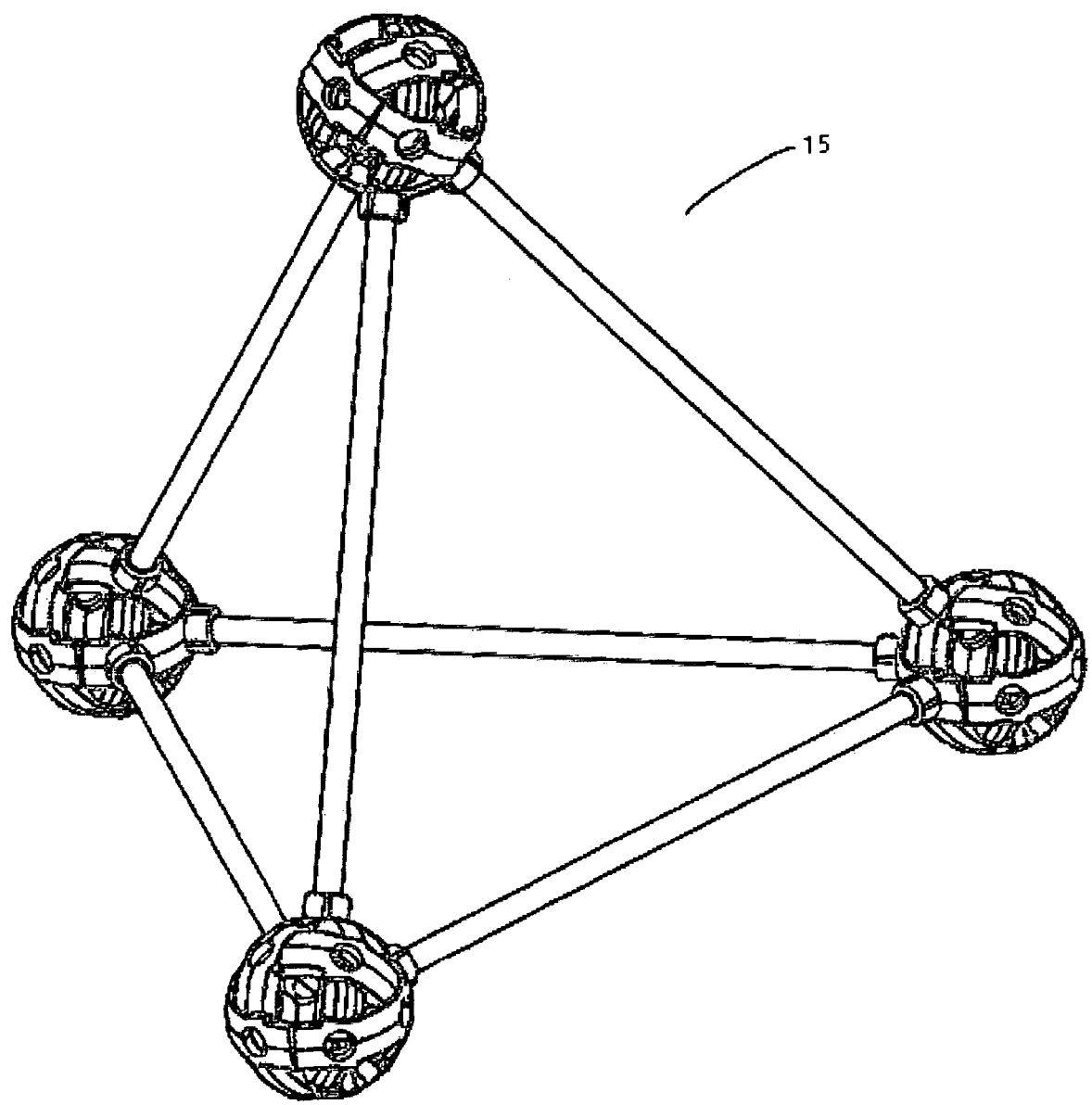
FIG. 8 shows one tetrahedron from an octet truss structure, constructed by using four spherical hubs and six connecting struts.

Connecting the Struts—FIGS. 7 and 8

Struts can be securely fastened to the assembled spherical hubs through the holes in the intersecting rings. The ring intersection holes give each hub 12 different connection locations to which struts can be fastened. The struts are fastened to the spherical hub with the use of a collar assembly (FIG. 7). The collar assembly is securely fastened to the spherical hub with components 12, 13 and 14 that screw together from the inside to the outside of the assembled rings.

The collar assembly would be screwed together by first inserting the internal collar parts 12 and 13 through a ring intersection hole, and then screwing the external collar part 14 onto the threaded collar parts 12 and 13 extending out from the inside of the hub. The connecting strut which is externally threaded on either end, screws into the collar assembly parts 12 and 13 which are internally threaded. The screwed together strut and collar assembly can rotate in the hole in the rings when screwing together the other end of the strut. This makes it possible to have the same thread direction on either end of the strut. Attaching struts to the hub through the ring intersection holes allows for the construction of fully triangulated truss structures such as that depicted in FIG. 8, commonly known as an octet truss structure 15.

ADVANTAGES

From the description above a number of advantages of some embodiments of this spherical hub become evident:

(a) The multiplicity of angles for struts connected to each hub creates flexibility in building design and construction.

(b) The struts can be easily inserted and removed even in completed structures, giving flexibility for modifying existing structures in accordance with preferred design changes.

(c) Hubs can be made larger or smaller depending on the requirements of the structure being built.

(d) The spaces between the hub's rings can be used for attaching additional components such as additional struts (up to six), foundation anchoring devices and ceiling, wall or floor panels. The combination of ring intersection holes and spaces between rings give each hub a total of 26 different connection locations.

(e) The use of flexible, lightweight material used in an injection molding process, reduces manufacturing costs.

(f) The rings, when disassembled, can be packed in a highly compact way, providing ease of storage and shipping.

CONCLUSIONS, RAMIFICATIONS, AND SCOPE

In conclusion, the reader will see that the spherical hub described in this application will create many new opportunities to construct space frame structures in a wide variety of shapes and applications, from small structures such as outdoor storage sheds, scaffolding, fences, etc. to large multipurpose buildings. Designers and builders are accorded flexibility by the number of ways that struts and, as necessary, foundation anchoring devices, and ceiling, floor or wall panels can be connected to the hub.

I claim:

1. A spherical hub mechanism for use in building space frame and other structures, wherein:

said hub mechanism includes four concentric rings that can be easily assembled and disassembled, said rings are grooved so that they fit and lock together in a specific order to hold a spherical form;

said hub mechanism also includes connecting collar devices that can be used to connect strut members to said hub;

said hub mechanism provides openings for standard diameter, conventionally threaded pipes, used as connecting strut members by inserting said pipes into said collar devices;

said collar devices are comprised of two semi-cylindrical internal collar parts fastened by a cylindrical external collar part, said semi-cylindrical internal collar parts are each internally threaded on a first end and externally threaded on a second end, said semi-cylindrical internal collar parts fit together to form a cylindrical form, said external collar part is internally threaded, said external collar part is threaded onto said exterior threads of said semi-cylindrical internal collar parts;

said openings are distributed within said hub so that said pipes can be inserted in a multiplicity of angles; and said rings, when disassembled can be stored and shipped in a compact form.

* * * * *